July 3, 1951            D. A. COMSTOCK            2,559,402

AIR SPEED INDICATOR FOR BICYCLES

Filed Oct. 4, 1948

Inventor

David A. Comstock

By

Wooster & Davis

Attorneys

Patented July 3, 1951

2,559,402

UNITED STATES PATENT OFFICE 2,559,402

AIR-SPEED INDICATOR FOR BICYCLES

David A. Comstock, Wilton, Conn., assignor to D. A. Comstock and Company, Incorporated, South Norwalk, Conn., a corporation of Connecticut Application October 4, 1948, Serial No. 52,689

5 Claims. (Cl. 73—228)

1

This invention relates to an air speed indicator for bicycles and similar vehicles, and has for an object to provide a simple and effective indicator which may be carried by various vehicles, particularly mounted on the handle-bars of bicycles or the like to indicate the air speed of the vehicle.

Another object is to provide an improved construction for a device of this character in which the speed is indicated by a pivotally suspended vane which is so mounted and located as to be directly impinged by the air stream for most effective operation.

A further object is to provide an improved construction and arrangement for mounting this vane and the indicating means operated thereby.

With the foregoing and other objects in view, I have devised the construction illustrated in the accompanying drawings forming a part of this specification. It is, however, to be understood the invention is not limited to the specific details of construction and arrangement shown, but may embody various changes and modifications within the scope of the invention.

In this drawing:

Fig. 1 is a perspective view showing how the device may be mounted on the handle-bars of a bicycle or the like;

The device comprises a housing 10, preferably of a die casting, although it could be of other materials if desired, and is preferably of circular or cylindrical shape. It is cast open at the top, with a flange 11 and a shoulder 12 spaced a suitable distance below the rim of the flange for a purpose presently to be described. The device is intended primarily to be mounted on the handle-bars of a bicycle or similar vehicle where it is in direct view of the rider, but of course can be

Figure 1:
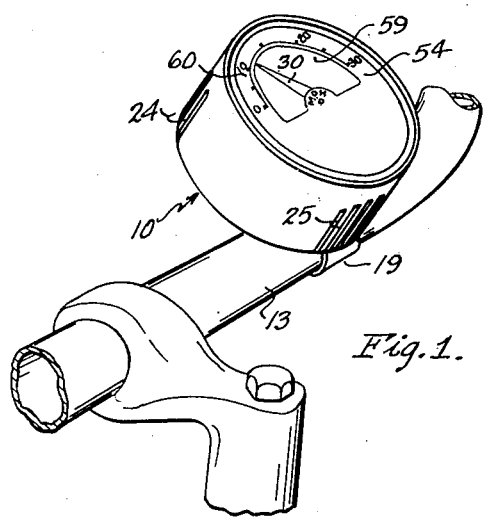
Figure 2:
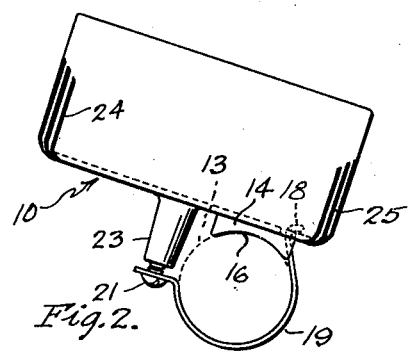
Fig. 2 is a side view thereof.
Figure 3:
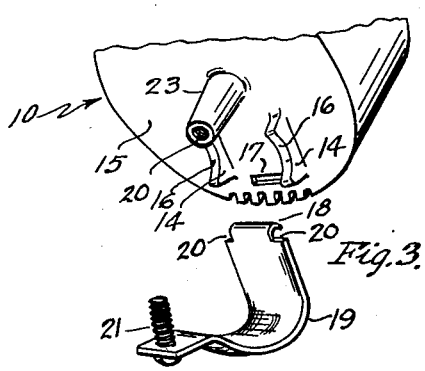
Fig. 3 is a perspective exploded view showing means for mounting the device on a handle-bar.

2 used in other locations or on other vehicles as desired. For mounting it on the handle-bars, indicated at 13 in Fig. 1, the housing is provided with a pair of spaced lugs 14 projecting downwardly from its lower wall 15, and the edges of these lugs are curved, as indicated at 16, to fit the curvature of the bar 13. Between or at one side of these lugs there is an elongated opening 17 through the bottom wall to receive the hooked end 18 of a curved clamp 19. This clamp may be a metal strip, the hook 18 being narrower than the body of the strip to provide the shoulders 20. At its other end it is provided with an opening for a screw 21 which may be threaded into a tapped opening 22 in a tubular extension 23 projecting downwardly from the lower wall of the housing. The strap 19 is curved to fit the bar 13, and in mounting the device on the bar the lugs 14 seat on one side of the bar, the hook 18 is inserted in the slot or opening 17, as indicated in Fig. 2, and the clamp extended around under the bar with the screw 21 threaded into the extension 23. By tightening the screw the device is securely clamped in position on the bar and by merely loosening the screw the device may be adjusted to the desired angle and then clamped in position.

Figure 4:
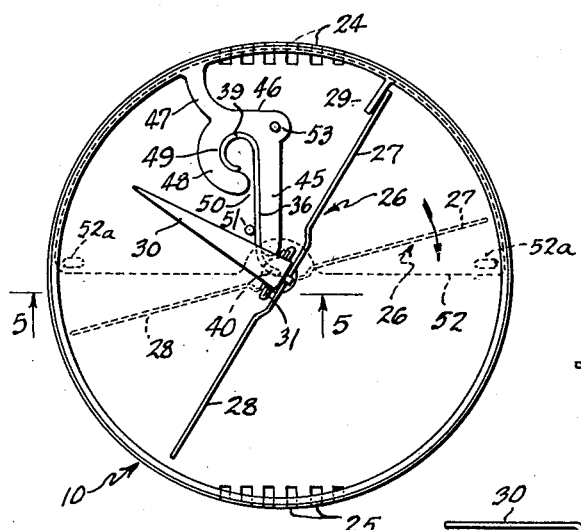
Fig. 4 is a top plan view of the device before the dial and lens cover are applied.

In the front side wall of the housing 10 are provided a series of air inlet or pressure openings 24, which in the present case are shown as upright slots although they could be of different shape if desired, with similar slots or openings 25 in the opposite or rear wall. Between the two is mounted the movable vane responsive to pressure of the air stream entering the openings 24. This comprises an upright thin strip 26 extending diagonally across the chamber in the housing. This may be made of any suitable light-weight material, preferably thin light-weight sheet metal, such, for example, as aluminum, and of a length somewhat less than the internal diameter of the housing, as indicated in Fig. 4. It is mounted, as shown in Fig. 4, so that its forward portion 27 is to one side of the high pressure openings or ports 24, and the other portion 28 on the opposite side of the low pressure openings or ports 25, and its normal or zero position is determined by a suitable stop, such, for example, as a rib or lug 29 extending inwardly from the side wall of the housing located to one side of the openings 24.

Figure 7:
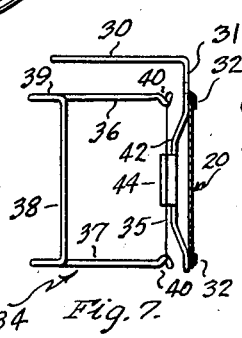
Fig. 7 is a side elevation of the supporting means for the vane, the vane being shown in section.
Figure 8:
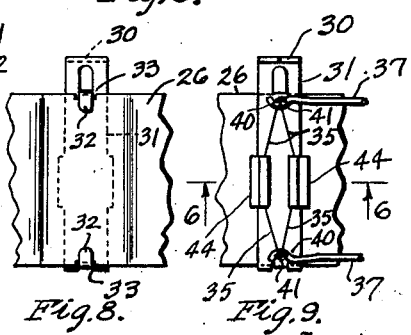
Fig. 8 is a front view looking from the right of Fig. 7.

Associated with this vane is an indicating means, in the present case a tapered finger or pointer 30. This is bent laterally from an upright thin metal strip 31, and the vane 26 is mounted in this strip by lancing lugs or tongues 32 from the strip and bending them over the upper and lower edges of the vane, as shown in Figs. 7 and 8, and to prevent longitudinal movement of the vane, notches 33 in which these lugs are seated are provided. The vane and the pointer are pivotally suspended on a supporting frame 34 by means of threads 35, preferably "nylon" threads as they have proven very satisfactory. The supporting frame 34 in the form shown comprises a spring wire bent to substantially U shape with upper and lower spaced arms 36 and 37 connected by the upright portion 38, and the connections between the arms 36 and 37 and the upright 38 are bent into a curve or loop 39 for mounting purposes, as will be presently described. The free ends of the arms 36 and 37 are bent into hooks 40 opening in opposite directions, and the opposite ends of the two thread supports 35 are extended over these hooks so as to be supported thereby, and the thread may be fastened to the hooks by a small amount of a suitable adhesive 41.

Figure 6:
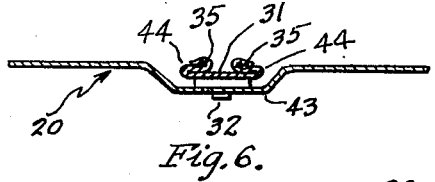
Fig. 6 is a longitudinal section through the vane and its mounting means taken substantially on line 6—6 of Fig. 9.
Figure 9:
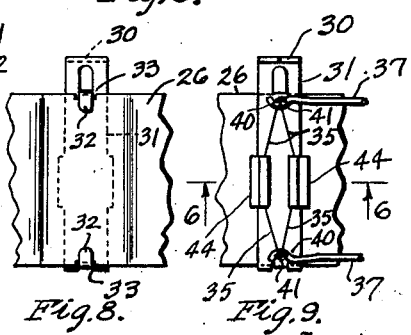
Fig. 9 is a rear view looking from the left of Fig. 7.

The vane and the pointer 30 are secured to the intermediate portion of these threads 35 in such a way as to be supported thereby and also to retain the central portions of the threads laterally spaced as shown in Fig. 9. For this purpose the intermediate portion of the upright portion of the strip 31 is offset away from the vane 26 as shown at 42, and the intermediate portion of the vane may be also offset in the opposite direction, as shown at 43, to locate the threads in substantially the plane of the vane for better balance of the vane. For the purpose of securing the vane to the threads, the strip 31 is provided on its opposite side edges with laterally extending ears or lugs 44 which are folded inwardly over the back of the strip as shown in Fig. 6, and then outwardly around the threads 35 to tightly clamp the threads, and these lugs are spaced laterally the proper distance to spread or separate the threads 35. As these folded ears or lugs clamp the threads they not only separate the threads and hold them separated the proper distance, but they also secure the vane to these threads so that it is freely supported thereby and may turn about a vertical axis extending about halfway between the threads 35, or that is, an axis between the hook supports 40. The supporting frame 34 being of spring wire, the arms 36 and 37 tend to separate and thus place a tension on these threads which tends to swing the vane backwardly to the normal or zero position shown in full lines, Fig. 4, against the limit stop 29.

Figure 5:
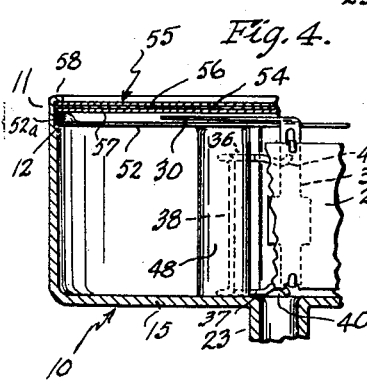
Fig. 5 is a transverse section of a portion of the device taken substantially on line 5—5 of Fig. 4, but showing the dial and lens in place.

Various means may be provided for mounting the frame or support 34 in the housing. In the present construction a partition wall 45 extends upwardly from the bottom wall 15 inwardly of the high pressure or inlet openings 24. It extends at its inner edge from about the center of the housing, but at its outer end is spaced from the openings 24, as shown at 46, and then extends to the side wall of the housing at the opposite side of these openings from the vane 26, as shown at 47. It is curved inwardly and away from the radial portion 45, as shown at 48, to form an upright curved recess 49 open at its inner side at 50 to receive the curved portions 39 and the upright portion 38 of the wire supporting frame 34, as shown in Figs. 1 and 5. The arms 36 and 37 extend along one side of the partition 45, as shown, the lower arm 37 being between this partition and a retaining lug or pin 51 extending upwardly from the lower wall of the housing. This properly locates this frame in the housing, the curved portions 39 preventing the frame from sliding radially, and the stop pin or lug 51 holds it in proper position against the side of the partition 45 with the thread supporting hooks 40 in the center or axis of the housing, so that therefore the suspension threads 35 for the vane 26 and the pointer 30 are substantially in the center or axis of the housing. In assembling, the vane and the pointer may be mounted in the frame 34, as described, and then this assembly mounted in the housing by merely inserting it in the recess 49 and at the side of the partition 45.

After this assembly is thus mounted in the housing, a thin plate 52 comprising about a half of a disc is mounted on the shoulder 12 above the partition 45 and vane 26 but below the pointer 30. It may also rest on the top of partition 45, and is held in position by a pin or lug 53 on this partition extending into an opening in the plate. Above this plate and also over the pointer 30 is mounted a suitable indicating dial 54 and a transparent cover or lens 55. This may comprise any suitable construction, but in the present arrangement it comprises upper and lower transparent discs 56 and 57 between which is the dial 54, and these are supported on the shoulder 12 above the half disc or plate 52, but at a suitable distance above this plate to provide clearance for the pointer 30. This clearance may be secured by bumps 52a struck up from the plate 52. These elements are secured in position by rolling over the edge of the flange 11, as shown at 58, Fig. 5. The dial 54 is provided with a suitable curved opening 59 in alignment with the path of movement of the pointer 30, and along the outer edge of this opening it is provided with a suitable scale 60 calibrated to indicate air speeds of miles per hour.

In operation, the device is mounted on the handle-bars, for example, as shown in Fig. 1, with the high pressure or inlet ports 24 at the front, and the low pressure ports 25 at the rear. On movement of the bicycle forwardly, air enters through the ports 24 and impinges against the upper portin 27 of the vane 26, it being also deflected toward this vane by the upper portion 46 of the partition 45. This turns the vane or swings it clockwise as shown by the arrow and the dotted lines in Fig. 4, the amount of movement depending in the air pressure and therefore the speed of the vehicle, the movement being against the action of the thread suspension 35 tending to move it counterclockwise or to the zero position shown in full lines. The greater the movement clockwise the greater the tension placed on the thread suspension, and therefore the movement of the vane and the pointer 30 is proportional to the pressure caused by the speed of the vehicle. The dial 60 is calibrated to correspond with these movements to indicate the air speed of the vehicle.

This makes a very simple device comprising a minimum number of parts which can be readily assembled and which is effective in indicating the air speed of the vehicle on which it is mounted, and it may be mounted in a position directly in front of the rider where the indicator may be easily observed at all times.

Having thus set forth the nature of my invention, I claim:

1. An air speed indicator comprising a housing provided with air inlet and outlet openings in its front and rear walls respectively, an impact vane in the housing extending diagonally across the same at one side of said inlet openings so as to be impinged by air entering these openings, a partition in the housing extending inwardly toward the center from the side of the housing on the other side of said inlet openings, a spring frame mounted on the partition including spaced arms tending to separate and a portion connecting said arms, a thread suspension for the vane comprising laterally spaced threads extending between said arms, means fastening the vane to said threads between said arms, and indicating means operated by said vane.

2. An air speed indicator comprising a housing provided with air inlet and outlet openings in its front and rear walls respectively, an impact vane in the housing to the rear of the inlet openings in position to be impinged by air entering said openings, a spring frame mounted in the housing including upper and lower spaced arms and a member connecting said arms, a thread suspension extending between said arms, means mounting the vane on said thread suspension between the arms, said thread suspension being tensioned by the spring action of the frame to swing the vane in the opposite direction from the action of the air, and an indicator operated by the vane and visible through the top of the housing.

3. An air speed indicator comprising a housing provided with air inlet and outlet openings in its front and rear walls respectively, an impact vane in the housing to the rear of the inlet openings in position to be impinged by air entering said openings, means for pivotally mounting the vane and tending to shift it in the opposite direction from the action of the air comprising a spring frame mounted in the housing including upper and lower spaced arms and a member connecting said arms, a thread suspension extending between said arms and tensioned by the spring action of the frame, means mounting the vane on said thread suspension, and an indicator operated by the vane and visible through the top of the housing.

4. An air speed indicator comprising a housing provided with air inlet openings in the front wall thereof, an impact vane mounted in the housing to the rear of said openings in position to be impinged by air entering said openings to shift the vane, means pivotally mounting the vane comprising a spring frame mounted in the housing including upper and lower spaced arms and a member extending between and connecting said arms, a thread suspension extending between said arms including laterally spaced threads, means mounting the vane on said threads between the arms, said threads being tensioned by spring action of the frame to swing the vane in the opposite direction from action of the air, and an indicator operated by the vane.

5. An air speed indicator comprising a housing provided with air inlet means in its front wall, an impact vane mounted in the housing to the rear of said means in position to be impinged by air entering said means to shift the vane, a supporting frame comprising a spring wire bent to substantially U shape with the arms spaced one above the other, means mounting said frame in the housing, laterally spaced threads extending between said arms, means mounting the vane on said threads, the arms tending to separate by spring action of the frame to tension the threads and swing the vane in the opposite direction from action of the air, and an indicating means operated by the vane.

DAVID A. COMSTOCK.

REFERENCES CITED

The following references are of record in the file of this patent:

UNITED STATES PATENTS

| Number | Name | Date |
| --- | --- | --- |
| D. 149,829 | Mungen | June 1, 1948 |
| 1,162,366 | Jensen | Nov. 30, 1915 |
| 1,983,305 | Paulin | Dec. 4, 1934 |
| 2,060,848 | Boyle | Nov. 17, 1936 |
| 2,072,369 | Jenson | Mar. 2, 1937 |
| 2,075,424 | Bull | Mar. 30, 1937 |
| 2,316,255 | Knobel et al. | Apr. 13, 1943 |